United States Patent [19]

Perry

[11] Patent Number: 4,845,966

[45] Date of Patent: Jul. 11, 1989

[54] THEFT PREVENTION DEVICE FOR T-TOPS

[76] Inventor: James R. Perry, 2409 Big Cedar Ave., Edmond, Okla. 73034

[21] Appl. No.: 225,186

[22] Filed: Jul. 28, 1988

[51] Int. Cl.$^4$ .............................. F05C 5/02; B60J 7/18
[52] U.S. Cl. ........................................ 70/159; 70/203; 70/212; 296/224
[58] Field of Search ........................ 70/2, 3, 4, 5, 6, 7, 70/8, 9, 10, 11, 12, 13, 158, 159, 160, 161, 162, 163, 164, 165, 166, 167, 168, 169, 170, 171, 172, 173, 202, 203, 211, 212; 296/216, 218, 224

[56] References Cited

U.S. PATENT DOCUMENTS

| 3,712,665 | 1/1973 | Klein | 296/137 R |
| 3,769,821 | 11/1973 | Randel | 70/33 |
| 4,223,943 | 9/1980 | VanHulle et al. | 296/224 |
| 4,302,045 | 11/1981 | McAdams, Sr. | 296/224 |
| 4,367,454 | 1/1983 | Modica | 340/63 |
| 4,397,499 | 8/1983 | Work et al. | 296/218 |
| 4,453,750 | 6/1984 | Alford | 70/202 |
| 4,468,064 | 8/1984 | McAdams, Sr. | 296/224 |
| 4,505,139 | 3/1985 | Richards | 70/221 |
| 4,540,215 | 9/1985 | Swearingen | 296/218 |
| 4,632,209 | 12/1986 | Russell | 70/203 |
| 4,637,649 | 1/1987 | Cambria | 296/224 |
| 4,786,092 | 11/1988 | Shiraishi | 296/224 |

Primary Examiner—Robert L. Wolfe
Attorney, Agent, or Firm—Dunlap, Codding, Peterson & Lee

[57] ABSTRACT

A theft prevention device for T-tops. A first latch panel opens and closes over the latch handle of the T-top latch assembly. A conventional lock is used to lock the first panel in the closed position preventing access to the latch handle and, thus, removal of the T-top. The device is supported over the latch housing by ends which cooperate with the latch pins of the T-top.

6 Claims, 3 Drawing Sheets

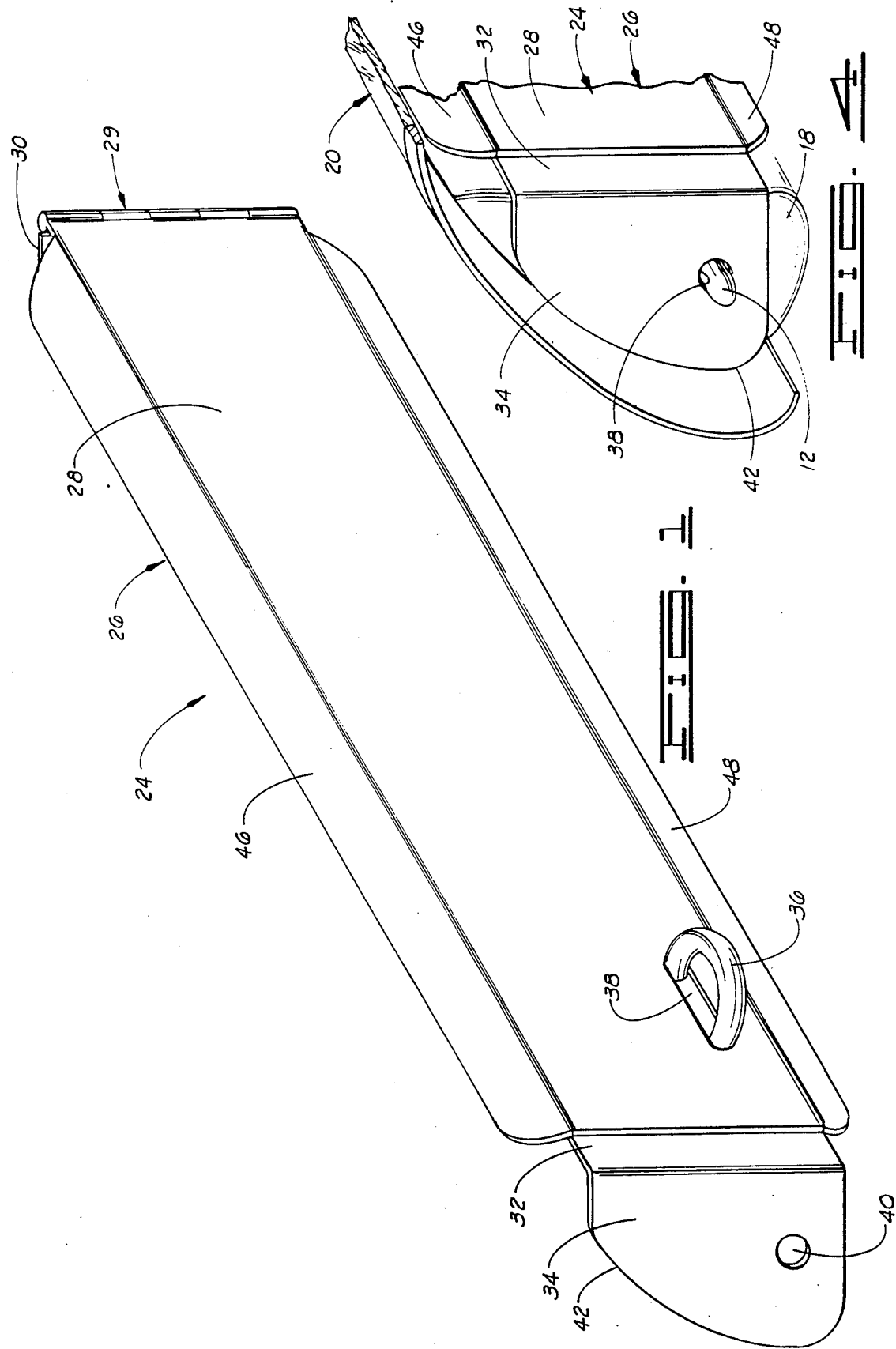

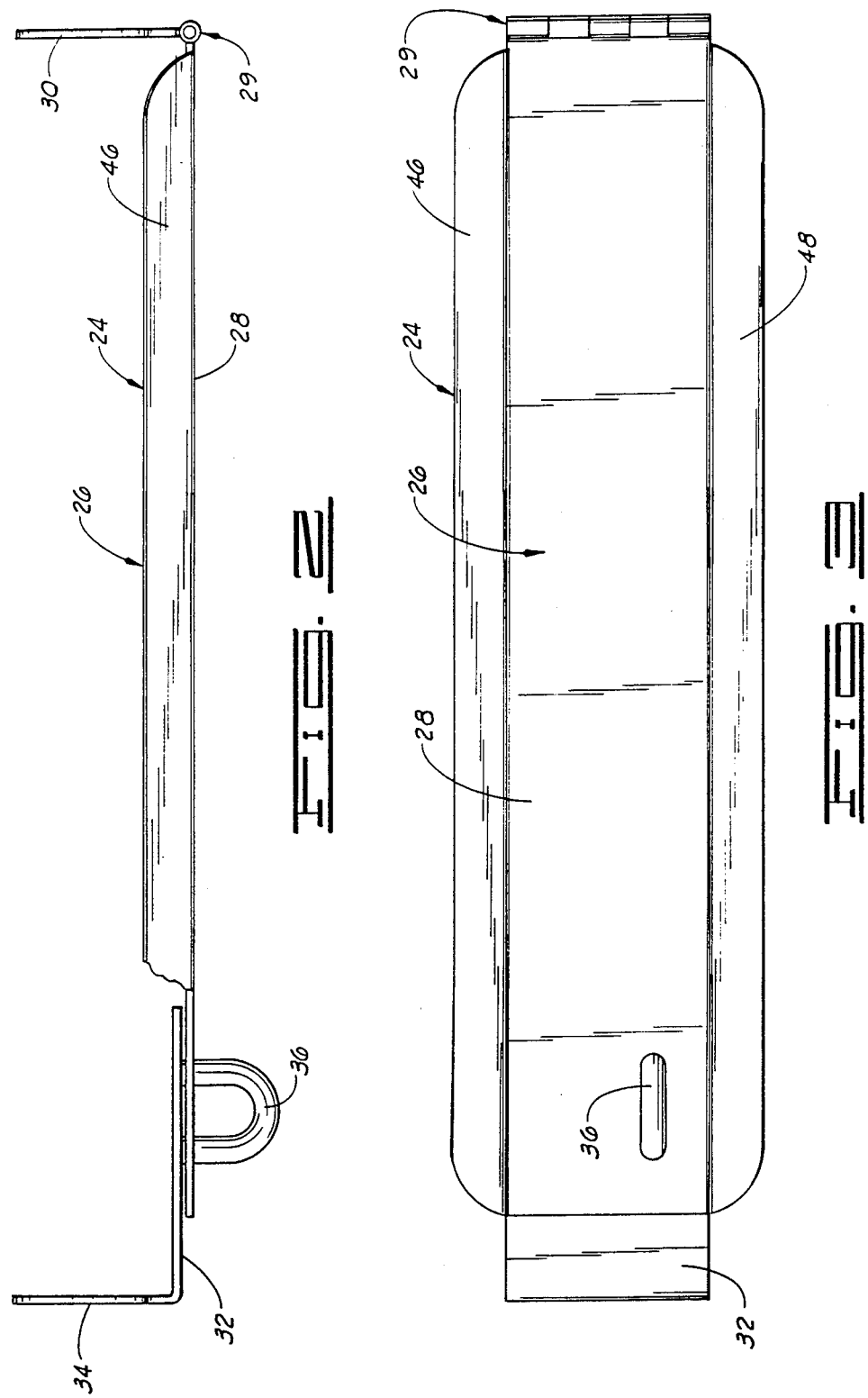

THEFT PREVENTION DEVICE FOR T-TOPS

FIELD OF THE INVENTION

The present invention relates to theft prevention devices for T-tops on automobiles.

SUMMARY OF THE INVENTION

The present invention is directed to a device for preventing removal of automobile T-tops of the type which includes a latch assembly comprising first and second latch pins operated by a latch handle. The device comprises a latch control member having an open and a closed position. When the device is in the open position, the latch assembly of the T-top may be disengaged. When the device is in the closed position, disengagement of the latch assembly is prevented. The device further comprises means cooperative with the latch pins of the T-top for supporting the latch control member, and means for permitting the latch control member to be locked in the closed position.

BRIEF DESCRIPTION OF THE FIGURES

FIG. 1 is a frontal perspective view of the device of the present invention.

FIG. 2 is a top plan view of the device shown in FIG. 1.

FIG. 3 is a front elevational view of the device shown in FIG. 1.

FIG. 4 is a fragmented perspective view showing the end of the device shown in FIG. 1. The device is shown in position over the latch assembly housing of a T-top. The latch pin is shown in the engaged position with the pin extending through a hole in the end of the device.

DETAILED DESCRIPTION OF THE PREFERRED EMBODIMENT

It is becoming increasingly popular to provide automobiles, especially sports cars, with a pair of removable roof panels, now commonly called "T-tops". The name is derived from the fact that with the panels removed, the top of the car resembles the letter "T".

Figure 5:
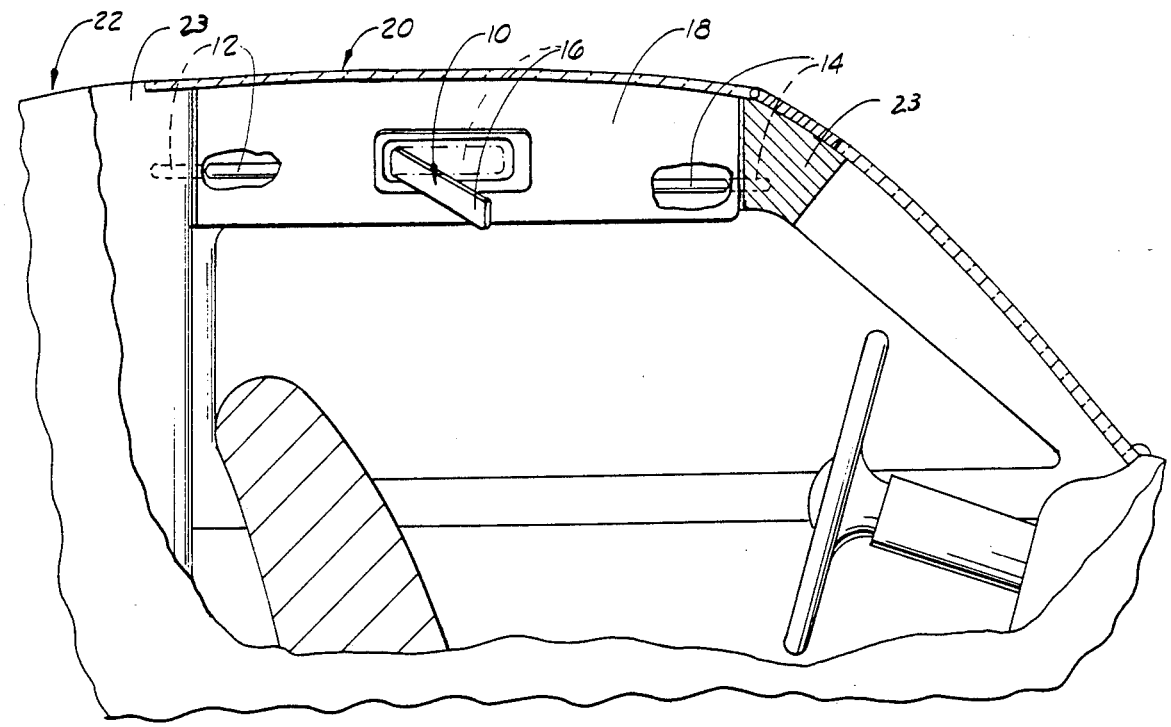
FIG. 5 is a fragmented elevational view, partly in cross section, of the upper front portion of an automobile having a typical T-top. The latch assembly of the T-top is shown in a disengaged position. The engaged position of the latch handle and latch pins is shown in phantom.

Although the style and construction of T-tops vary somewhat with the make and model of the car, most T-tops are held in position by a latch assembly. A typical latch assembly is shown in FIG. 5, and is designated by the reference numeral 10. This assembly comprises first and second latch pins 12 and 14 which are operated by a latch handle 16. The latch assembly 10 is contained within a housing 18 in the T-top 20.

When the latch is in the disengaged position, shown in solid lines, the latch handle 16 is pulled away from the housing 18 and the latch pins 12 and 14 are retracted inside the housing. With the pins in this position, the T-top 20 can be placed in or lifted out of the roof of the car 22.

When the latch is in the engaged position, shown in phantom, the latch handle 16 is pushed in and the pins 12 and 14 are extended. The ends of the pins are received in recesses (not shown) in the adjacent portion 23 of the roof of the car 22. Thus, with the latch in the engaged position, the T-top 20 cannot be removed.

Theft of the T-tops is quickly and easily accomplished by breaking into the car, usually through the window or windshield or by jimmying the door lock, and then opening the latch and carrying off the T-top. Because T-tops from the same make and model of car are interchangeable and expensive, T-top theft is on the rise.

The present invention provides a device of simple construction which can be installed and removed quickly and easily. When locked in position, the device prevents disengagement of the latch assembly even if access to the inside of the car is achieved.

Referring now to FIGS. 1-4, the device of the present invention is designated generally by the reference numeral 24. The device comprises a latch control member 26 having an open and a closed position. In the open position, the latch handle may be operated to engage and disengage the latch assembly of the T-top. In the closed position, the latch control member prevents disengagement of the latch assembly and thus, removal of the T-top.

Preferably, the latch control member 26 comprises a first latch panel 28. The first latch panel may be supported, such as by a hinge 29, on a first end 30 for pivotal movement between an open position and a closed position.

In the preferred construction, the latch control member 26 also includes a second latch panel 32 adapted for engaging the first latch panel 28. The second latch panel 32 ma be supported on a second end 34. A staple 36 preferably is provided on the second latch panel 32, the staple being receivable in a slot 38 on the first latch panel 28. This staple and slot engagement is one way of permitting the latch control member to be locked in the closed position.

As best shown in FIG. 4, for supporting the latch control member 26 in position with respect to the latch assembly, the first and second ends 30 and 34 of the device may be adapted to cooperate with the latch pins 12 and 14. Accordingly, each end may be shaped to define a space, such as the hole 40, adapted to receive the latch pin 12 so that when the latch pin is extended, the end is held securely in position.

Still referring to FIG. 4, the alignment of the hole 40 with the path of the latch pin may be facilitated by having the edge 42 of the end 34 shaped to conform to the contour of the T-top 20. For ease of installation, the thickness of the ends 30 and 34 preferably is such that the ends may be wedged between the latch housing 18 and the adjacent portion 23 of the roof of the car when the T-top is in position and remain in position there without being manually supported. In this way, both hands of the operator will be left free to engage the latch, close the first latch panel, and lock the device, as described below.

It now will be recognized that the device should be made of a strong, sturdy material such as solid steel which cannot be broken or sawed through easily. The shape of the device may be varied according to the model of automobile and most preferably will be designed to fit closely to the latch assembly housing with which the device will be used.

In the embodiment shown in the Figures, the device may be constructed of straps of stainless or chrome plated steel which is about ⅛ inch thick and about 3 inches wide. To accommodate the curvature of the latch assembly housing and to more completely obstruct access to the latch handle, the latch control member 26 may be provided with upper and lower flanged portions 46 and 48, as best shown in FIG. 4. To this end, the first latch panel may be conveniently formed by pressing and cutting a strip of 5 inch wide metal into the desired shape.

Figure 6:
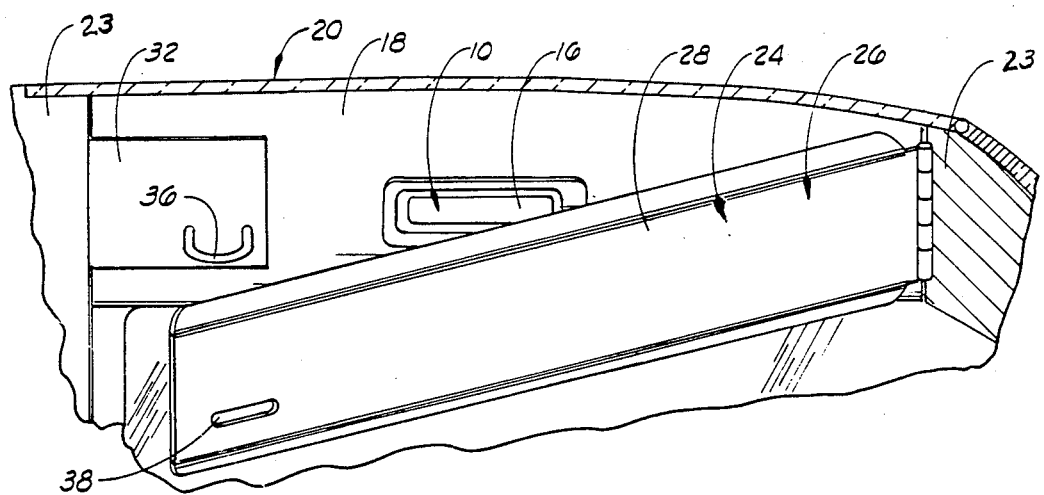
FIG. 6 is an enlarged fragmented elevational view showing the T-top latch assembly in FIG. 5 and showing the device of the present invention in the open position.
Figure 7:
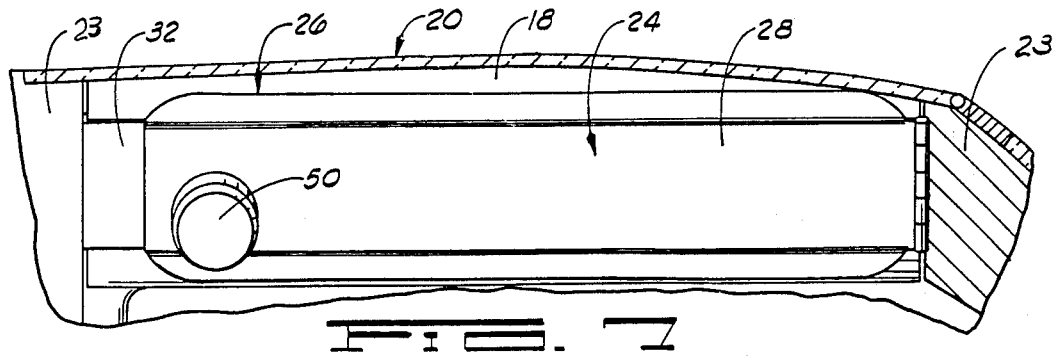
FIG. 7. is an enlarged fragmented elevational view of the T-top latch assembly of FIG. 6 with the device locked in the closed position.

The use of the theft prevention device of this invention is depicted in FIGS. 5-7. First, the T-top 20 is positioned in the roof 22 of the car in the usual manner, as shown in FIG. 5.

Next, as shown in FIG. 6, the ends 30 and 34 of the device 24 are inserted between the sides of the housing 18 and the adjacent portions 23 of the roof of the car 22. As previously described, the ends of the device preferably are contoured to fit snugly in this space so that when the ends are fully inserted, the holes in the ends will be aligned with the latch pins and the device will be held in this position without support.

With the ends of the device positioned so, and with the first latch panel 28 open, the latch handle 16 is depressed. This extends the latch pins 12 and 14, and places the latch assembly 10 in the engaged position (See FIGS. 4 and 5), fixing the device in position.

Finally, as shown in FIG. 7, the first latch panel 28 is closed over the second latch panel 32 with the staple 36 extending through the slot 38. A lock 50 then may be attached in the usual manner to prevent opening of the device.

A lock having a solid stainless steel cylindrical housing is preferred. One such lock is described in U.S. Pat. No. 3,769,821 and is marketed as the Series 2000 lock by the American Padlock Company. Using a lock of this construction, the staple of the device and the hasp of the lock are completely enclosed and cannot be pried open or sawed off without first cutting through the solid steel housing. Also, a lock of this type is more pleasing in appearance and will not hang down into the head space of the vehicle.

With the device of this invention locked in place, the latch assembly cannot be disengaged and the T-top cannot be removed without extraordinary measures, such as breaking the lock or sawing through the latch control panel. These measures are noisy, time consuming, require special tools and are likely to result in damage to the T-top itself. As a result, thieves are likely to be discovered before the theft is completed. Moreover, upon observing this theft prevention device in place, a would-be thief is more likely to move on to another vehicle not equipped with such a device.

Changes may be made in the nature, composition, operation and arrangement of the various elements, steps and procedures described herein without departing from the spirit and scope of the invention as defined in the following claims.

What is claimed is:

1. A device for preventing removal of the T-top of an automobile, wherein the T-top includes a latch assembly comprising first and second latch pins operated by a latch handle, the device comprising:

a latch control member having an open position and a closed position, wherein in the open position the latch assembly of the T-top may be disengaged, and in the closed position disengagement of the latch assembly is prevented;

means cooperative with the latch pins of the T-top for supporting the latch control member; and means for permitting the latch control member to be locked in the closed position.

2. The device of claim 1 wherein the latch control member comprises a first latch panel which opens and closes so that in the open position access to and operation of the latch handle of the T-top is permitted and in the closed position access to the latch handle is prevented.

3. The device of claim 2 wherein the support means comprises:

a first end on which the first latch panel is movably supported and which is engagable with the first latch pin on the T-top latch assembly when the latch pin is extended; and a second end engagable with the second latch pin of the T-top latch assembly when the latch pin is extended;

and wherein the latch control member further comprises a second latch panel supported by the second end and adapted for engaging the first latch panel.

4. The device of claim 3 wherein the locking means comprises a slot on the first latch panel and a staple on the second latch panel receivable in the slot.

5. The device of claim 4 wherein each of the first and second ends defines a hole aligned with the path of the first and second latch pins, respectively, so that when the latch pins are extended the pins pass through the holes.

6. The device of claim 3 wherein each of the first and second ends defines a hole aligned with the path of the first and second latch pins, respectively, so that when the latch pins are extended the pins pass through the holes.

* * * * *